United States Patent
Loveless et al.

(10) Patent No.: US 10,856,370 B2
(45) Date of Patent: Dec. 1, 2020

(54) ELECTRIC INDUCTION HEAT TREATMENT

(75) Inventors: Don L. Loveless, Rochester, MI (US); Valery I. Rudnev, Rochester Hills, MI (US); Joseph M. O'Haire, Washington Township, MI (US); Randall J. Minnick, Lake Orion, MI (US); Brian L. Marshall, Troy, MI (US)

(73) Assignee: INDUCTOHEAT, INC., Madison Heights, MI (US)

( * ) Notice: Subject to any disclaimer, the term of this patent is extended or adjusted under 35 U.S.C. 154(b) by 1240 days.

(21) Appl. No.: 12/176,363

(22) Filed: Jul. 19, 2008

(65) Prior Publication Data

US 2009/0020525 A1  Jan. 22, 2009

Related U.S. Application Data

(60) Provisional application No. 60/951,200, filed on Jul. 21, 2007.

(51) Int. Cl.
  *H05B 6/40* (2006.01)
  *C21D 1/42* (2006.01)
  (Continued)

(52) U.S. Cl.
  CPC ............... *H05B 6/405* (2013.01); *C21D 1/18* (2013.01); *C21D 1/42* (2013.01); *C21D 9/32* (2013.01); *Y02P 10/25* (2015.11)

(58) Field of Classification Search
  CPC ....... B05D 3/0272; B23P 25/003; B27M 1/06
  (Continued)

(56) References Cited

U.S. PATENT DOCUMENTS 2,167,798 A * 8/1939 Denneen ................ H05B 6/405
                                                                219/640
3,236,993 A * 2/1966 Jones ............................ 219/640
(Continued)

FOREIGN PATENT DOCUMENTS

JP        62127424 A      6/1987
JP        H08-506142 A    7/1996
(Continued)

OTHER PUBLICATIONS

J.R. Davis (editor), "Gear Materials, Properties, and Manufacture", 2005, pp. 7-8, Publisher: ASM International, Published in: Materials Park, Ohio.
(Continued)

*Primary Examiner* — Tu B Hoang
*Assistant Examiner* — Thomas J Ward
(74) *Attorney, Agent, or Firm* — Philip O. Post

(57) ABSTRACT

An induction coil with inner and outer coil segments joined together by a transition segment is arranged so that the outer coil segment generally inductively heat treats an annular outer region of a workpiece positioned under the coil, the inner coil segment generally inductively heat treats an annular inner region of the workpiece, and the transition segment traverses at least a portion of the width of the overall annular region of the workpiece to be heat treated. Relative arrangement of inner, outer and transition coil segments provides for controlled induction heat treatment across the overall annular region such as the gear teeth region of an intersecting axes or non-intersecting and non-parallel axes gear.

22 Claims, 10 Drawing Sheets

(51) Int. Cl.
*C21D 9/32* (2006.01)
*C21D 1/18* (2006.01)

(58) Field of Classification Search
USPC ... 219/60, 608–18, 632, 640, 647, 650, 652, 219/656, 657, 660, 672, 674, 676, 677
See application file for complete search history.

(56) References Cited

U.S. PATENT DOCUMENTS

| | | | |
|---|---|---|---|
| 3,446,495 A | | 5/1969 | Pfaffman et al. |
| 4,251,707 A | * | 2/1981 | Pusateri .................. H05B 6/40 219/635 |
| 4,675,488 A | | 6/1987 | Mucha et al. |
| 4,728,761 A | * | 3/1988 | Mucha .................... C21D 9/30 148/572 |
| 4,749,834 A | | 6/1988 | Mucha et al. |
| 4,757,170 A | | 7/1988 | Mucha et al. |
| 4,779,070 A | * | 10/1988 | Hackworth ............ H01F 7/202 335/296 |
| 4,785,147 A | * | 11/1988 | Mucha et al. ................ 219/640 |
| 4,855,551 A | * | 8/1989 | Mucha .................... C21D 9/32 219/640 |
| 4,855,556 A | | 8/1989 | Mucha et al. |
| 5,124,517 A | | 6/1992 | Storm et al. |
| 5,360,963 A | | 11/1994 | Storm et al. |
| 6,548,793 B1 | | 4/2003 | Smith |
| 2005/0039830 A1 | | 2/2005 | Christofis et al. |
| 2005/0247704 A1 | | 11/2005 | Loveless et al. |

FOREIGN PATENT DOCUMENTS

| | | |
|---|---|---|
| JP | 11222626 A | 8/1999 |
| JP | 2003-342640 A | 12/2003 |
| JP | 2005-347069 A | 12/2005 |
| WO | 94/18808 A | 8/1994 |

OTHER PUBLICATIONS

V. Rudnev, D. Loveless, R. Cook and M. Black, "Handbook of Induction Heating", 2003, pp. 309; 316 and 321, Publisher: Marcel Dekker, Published in: NY.

* cited by examiner

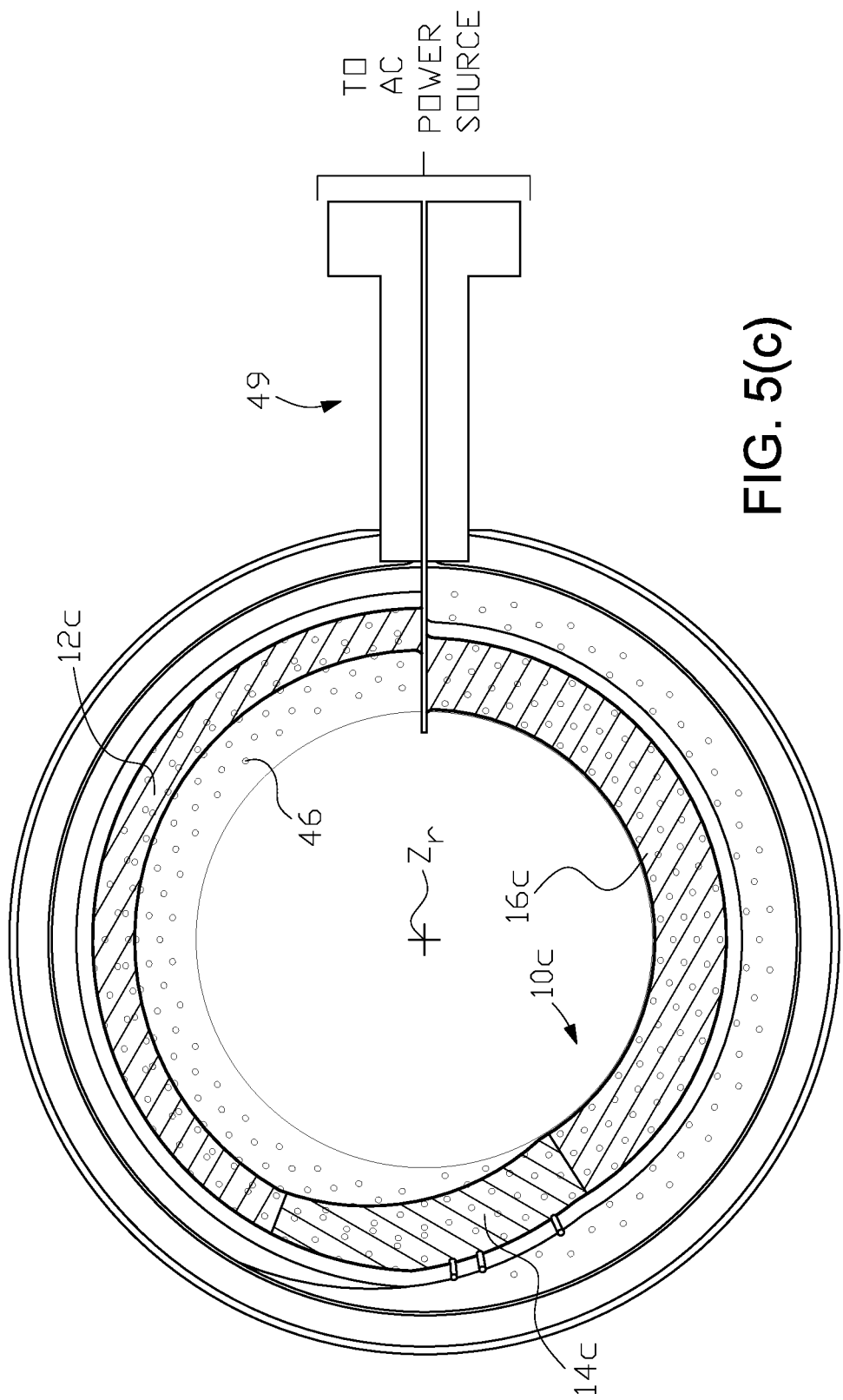

ELECTRIC INDUCTION HEAT TREATMENT

CROSS REFERENCE TO RELATED APPLICATIONS

This application claims the benefit of U.S. Provisional Application No. 60/951,200, filed Jul. 21, 2007, hereby incorporated by reference in its entirety.

FIELD OF THE INVENTION

The present invention generally relates to electric induction heat treatment of gears and gear-like electrically conductive articles, and in particular to such heat treatment for case or surface hardening of such gear and gear-like articles.

BACKGROUND OF THE INVENTION

Electric induction heating can be used to heat treat electrically conductive workpieces including gears and gear-like articles. Gears can be characterized as parallel axes, intersecting axes and non-intersecting (non-parallel) axes gears. The axes referred to are the central axis of the gear and interfacing pinion or gear. For example since two interacting spur gears have parallel axes, a spur gear is a type of parallel axes gear. Parallel axes gears are also characterized by radially, outwardly facing teeth as illustrated by spur gear 102 in FIG. 1(a) and FIG. 1(b). The teeth region of a parallel axis gear can be induction heat treated by locating the gear within an encircling induction coil 100. When suitable alternating current (ac) power is applied to the induction coil, the gear is inductively heated by magnetic coupling with the flux field established by the flow of ac current through the inductor as illustrated by typical equipotential lines of eddy current 104 and 110 in FIG. 1(a) and FIG. 1(b), respectively. The electrical frequency of the supplied current makes a noticeable effect on eddy current flow within the gear and induced heat distribution. Basically when it is necessary to harden the tooth tips only with a single frequency of current using a single-turn or multi-turn solenoid coil, a relatively high frequency (e.g. 30 kHz to 450 kHz) and high power density are applied. See for example FIG. 1(a). When relatively high frequency current (power) is applied to coil 100, eddy current induced heating in gear 102 follows the contour of the gear as indicated by representative heating profile lines 104. Since the highest concentration of the current density will be in tip 106 of the tooth, there will be a power surplus in tip 106 compared to root 108. Taking also into account that tip 106 of the tooth has the minimum amount of metal to be heated compared to root 108, the tip will experience the most intensive temperature rise over the entire heating cycle. In addition, from the thermal perspective, the amount of metal beneath the gear root represents a much greater heat sink compared to the tooth tip. Another factor that also complements the more intensive heating of the tooth tip deals with a better electromagnetic coupling due to the electromagnetic proximity effect between the inductor coil and tooth tip in comparison to the root; higher frequency has a tendency to make the proximity effect more pronounced. When inductively hardening tooth root 108, a relatively low frequency (e.g., 50 Hz to 20 kHz) is preferable. With a low frequency, the eddy current penetration depth is much greater than with high frequency. When heating fine pitch and medium pitch gears it is much easier for low frequency induced current to make a short path and follow the base circle or root line of the gear instead of following the tooth profile. See for example FIG. 1(b) and representative heating profile lines 110. The result is more intensive heating of the root fillet area compared to the tip of the tooth. Typically, in order to provide a hardness pattern that follows the profile of the gear tooth (from tip to root) preheating of the gear is required. Depending upon the gear geometry, preheating is usually accomplished by using a medium or low frequency (e.g. less than 20 kHz). High frequency (e.g. 30 kHz through 450 kHz) is applied during the final heating stage.

Electric induction hardening of intersecting axes and non-intersecting (non-parallel) axes gears present a technical challenge in that gear teeth characteristics, such as tooth contour that include root, pitch and face angles, tooth height, tooth fillet regions and face width, can vary depending upon the particular application of the gear. For typical illustrations of such gears see: FIG. 13 of "Gears Materials, Properties, and Manufacture", edited by J. R. Davis, Davis and Associates, published by ASM International, Materials Park, Ohio, 2005, for typical straight bevel, spiral bevel, zerol bevel and hypoid gears; FIG. 18 of the same reference for a typical example of a spiroid gear design; and FIG. 15 of the same reference for typical face gear terminology. FIG. 3(c) of this specification identifies typical gear tooth terminology.

One object of the present invention is to provide apparatus and method of induction heat treatment of teeth regions of intersecting axes and non-intersecting (non-parallel) axes gears to improve the uniformity and repeatability of induced heat temperature profiles and hardness patterns for the gear teeth regions.

Another object of the present invention is to improve the robustness of an induction heating system for heat treatment of gears and gear-like articles.

BRIEF SUMMARY OF THE INVENTION

In one aspect the present invention is an apparatus for, and method of, electric induction heating of a gear-like article having one or more discrete protrusions from a surface of the article, such as the gear teeth of selected types of gears. At least one single turn induction coil comprises at least one outer coil segment, at least one inner coil segment and a transition coil segment that joins together adjacent ends of each of the at least one outer and inner coil segments. The outer coil segment is arranged, in general, to inductively heat the outer annular region of the one or more discrete protrusions of the article, and the inner induction coil segment is arranged, in general, to inductively heat the inner annular region of the one or more discrete protrusions when the article is rotated adjacent to the induction coil and an alternating current is supplied to the at least one single turn induction coil. The transition segment is arranged to transverse at least partially across the length of the one or more discrete protrusions from the surface of the article as the article is rotated. When the one or more discrete protrusions from the surface of the article are rotated under the single turn induction coil with alternating current supplied to the coil the gear-like article is inductively heated.

In some examples of the invention the gear-like article is an intersecting axes gear or a non-intersecting and non-parallel axes gear wherein the one or more discrete protrusions from the surface of the article are gear teeth.

The above and other aspects of the invention are set forth in this specification and the appended claims.

BRIEF DESCRIPTION OF THE DRAWINGS

The appended drawings, as briefly summarized below, are provided for exemplary understanding of the invention, and do not limit the invention as further set forth in this specification and the appended claims:

FIG. 5(c) is a cross sectional view through line D-D in FIG. 5(b) of the electric induction heat treatment apparatus shown in FIG. 5(b) except for the workpiece and associated support structure.

DETAILED DESCRIPTION OF THE INVENTION

Figure 1A:
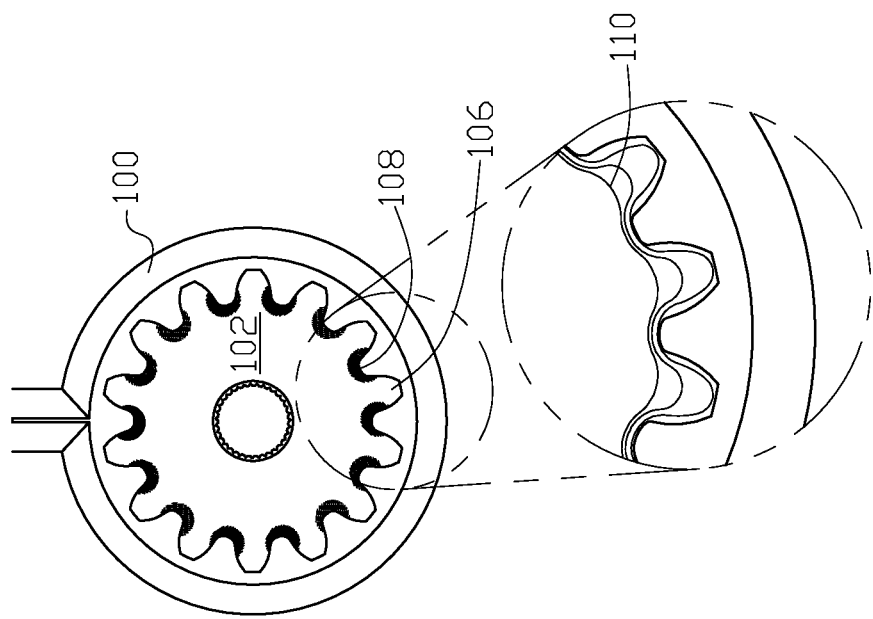
FIG. 1(a) and FIG. 1(b) illustrate a prior art method of induction heat treatment of a parallel axes gear.
Figure 1B:
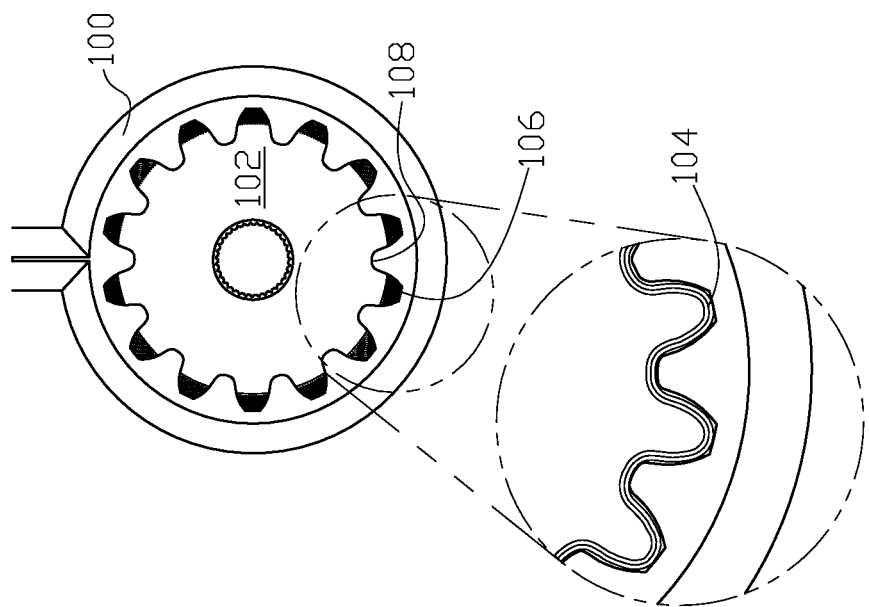
Figure 2A:
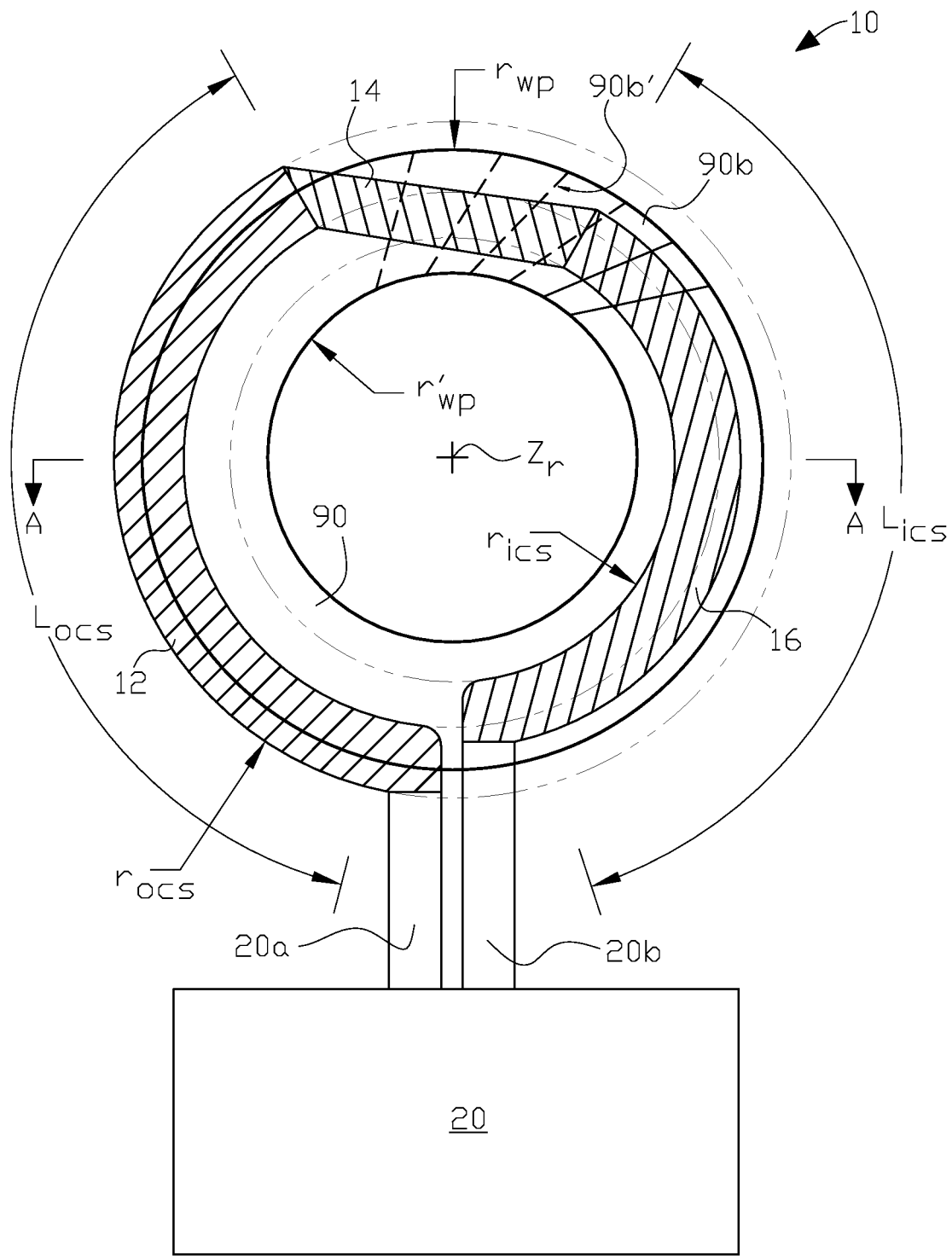
FIG. 2(a) is a diagrammatic top view of one example of the electric induction heat treatment apparatus of the present invention.
Figure 2B:
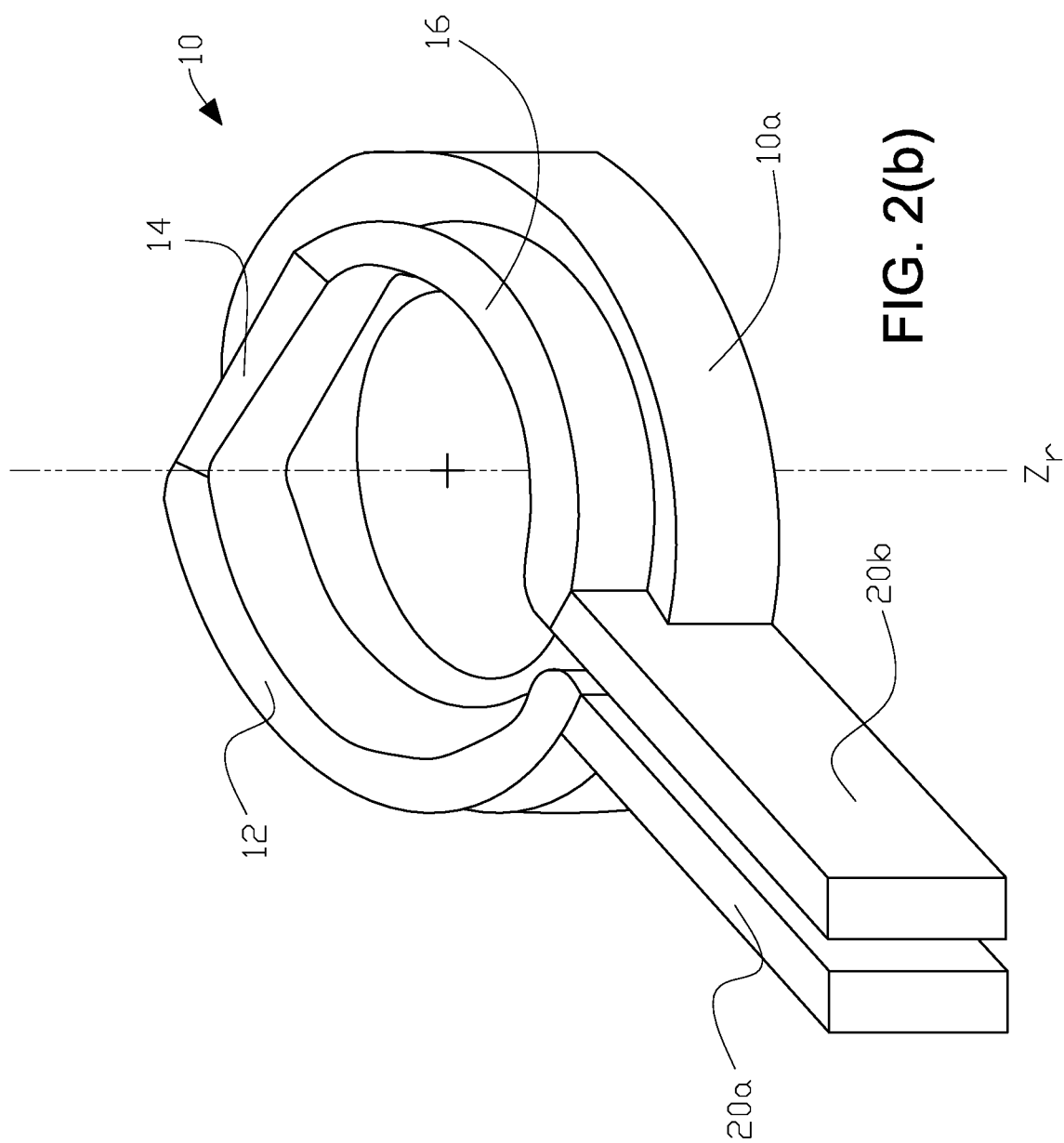
FIG. 2(b) is a diagrammatic perspective view of the electric induction heat treatment apparatus shown in FIG. 2(a).

One non-limiting example of the electric heat treatment apparatus of the present invention is diagrammatically illustrated in FIG. 2(a) and FIG. 2(b). Induction coil 10 comprises three coil segments, namely outer coil segment 12, transition coil segment 14 and inner coil segment 16 (each segment illustrated in different angled cross hatch in FIG. 2(a)). As illustrated in the figures, relative to the location of the central axis, Zr, of a workpiece to be inductively heated with the apparatus, the outer coil segment is radially disposed further away from axis Zr than the inner coil segment, with the transition coil segment joining together the ends of the outer and inner coil segments as illustrated in FIG. 2(a) and FIG. 2(b). These ends may be referred to as the inner ends of the outer and inner coil segments. The opposing ends of the outer and inner coil segments are connected to ac power source 20 via electrical conductors 20a and 20b. These ends may be referred to as the outer ends of the outer and inner coil segments.

Induction coil 10 may optionally include a base element 10a, as diagrammatically illustrated in FIG. 2(b), upon which the outer, inner and transition segments are formed. The base element may optionally be electrically conductive or non-electrically conductive, and can serve an auxiliary function, such as providing space for components of a quench system as further described below.

Figure 3A:
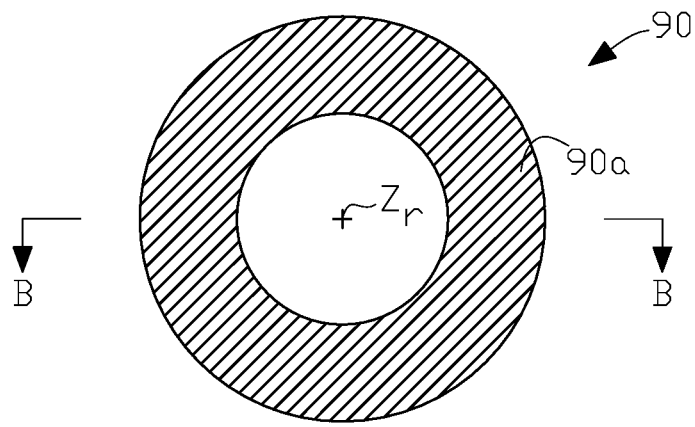
FIG. 3(a) and FIG. 3(b) are a diagrammatic top view and cross sectional cut (through line B-B in FIG. 3(a)) of a type of gear that can be hardened with the electric induction heat treatment apparatus of the present invention.
Figure 3B:
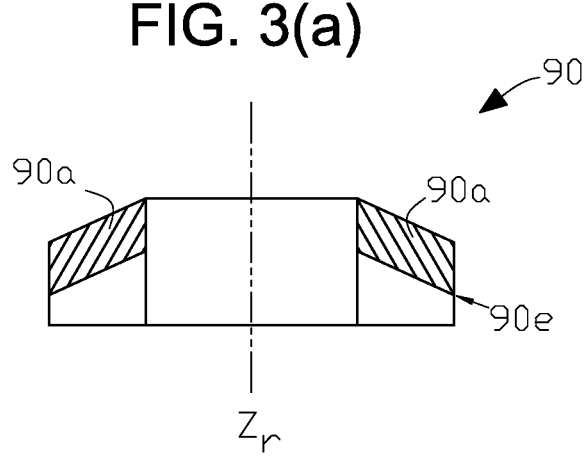
Figure 3C:
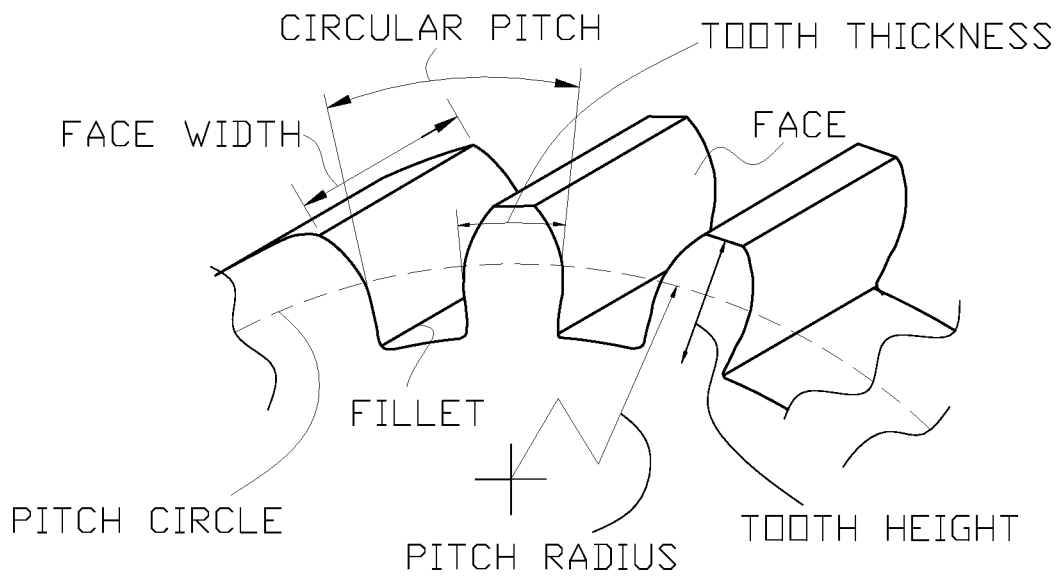
FIG. 3(c) is an illustration of typical gear tooth terminology.

By way of example, and not limitation, the electric heat treatment apparatus of the present invention is particularly suitable for induction heat treatment of workpieces represented by the gear teeth regions of intersecting axes or non-intersecting (non-parallel) axes gears, such as, but not limited to, straight bevel, spiral bevel, zerol bevel, hypoid, and spiroid gears, which can be generalized as workpieces with an annular, conical pitch, teeth region, diagrammatically illustrated as cross hatched region 90a for gear 90 in FIG. 3(a) and FIG. 3(b). These types of gears are generally distinguished by variations in tooth contour that include root, pitch and face angles, tooth height, tooth fillet regions, and face width, which will vary depending upon a particular type and application of the gear. As further explained below the electric induction heat treatment apparatus of the present invention is particularly advantageous in achieving substantially uniform gear tooth hardening with such variations in tooth angle, tooth height and/or tooth fillet regions, as well as width of the gear face.

In a typical but non-limiting arrangement, induction coil 10 shown in FIG. 2(a) and FIG. 2(b) is inverted and workpiece 90 is placed below the induction coil with the teeth region of the gear facing the induction coil. A face of each segment of the induction coil opposes regions of the one or more discrete protrusion as further described herein. The workpiece is rotated as further described below.

Outer and inner coil segments 12 and 16 may be arcuate, or of other shapes, to conform to the shape of the region of the workpiece that is heat treated, and to achieve a particular induction heat treatment profile. Workpiece 90, although generally referred to as a gear, may also be a gear-like article wherein one or more elements of the workpiece protrude from a surface of the workpiece similar to gear teeth protruding from the surface of a gear, but not necessarily with the symmetry or similitude of each of the one or more elements. For example gear teeth region 90a protrudes from the surface 90e in FIG. 3(b). The lengths, $L_{ocs}$ and $L_{ics}$, as well as the widths, $w_{ocs}$ and $w_{ics}$, in FIG. 4(a) of the outer and inner coil segments, respectively, can be selected to control the induced heat distribution pattern across the face or region of the workpiece.

In the preferred, but non-limiting examples of the invention, the transition coil segment is generally oriented so that eddy current induced in the inductively heated gear teeth regions generally flows in a transverse direction across the length of the gear's teeth, which induces heat in the roots of the gear teeth. Generally this is achieved by orienting the length of the transition coil segment so that it cuts transversely at least partially across the length of the face width $90b'$ of the gear teeth as illustrated in FIG. 2(a) for exemplary gear teeth 90b, which are shown diagrammatically in the figure.

The inside boundary, $r_{ics}$, of inner coil segment 16 is typically greater than the inside radial boundary, $r'_{wp}$, of the teeth region of workpiece 90, which assists in the distribution of induced heat in the teeth region of the workpiece. This also prevents overheating in the workpiece near its inner boundary (due to the electromagnetic ring effect), which avoids excessive heat treated hardness depth in the same region.

The outside boundary, $r_{ocs}$, of outer coil segment 12 is typically greater than the outside boundary, $r_{wp}$, of workpiece 90, which assists in the controlled distribution of induced heat in the teeth region of the workpiece. This also avoids under heating of the workpiece near its outer boundary (due to the electromagnetic end effect), which avoids reduced heat treated hardness depth in the same region.

Figure 4A:
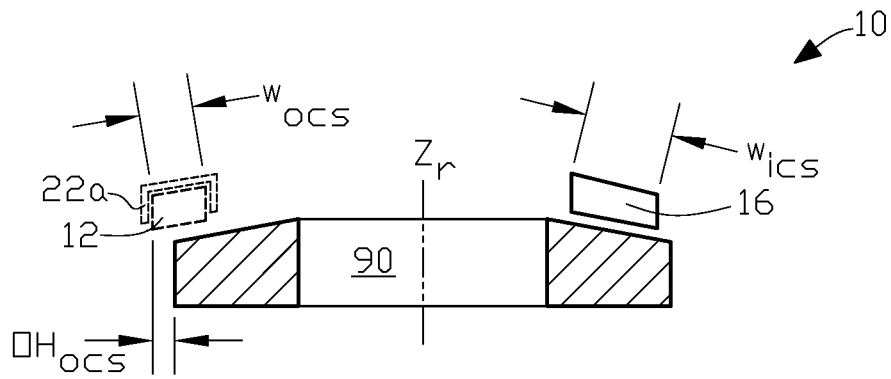
FIG. 4(a) is a cross sectional view through line A-A in FIG. 2 of the induction coil illustrated in FIG. 2(a).
Figure 4B:
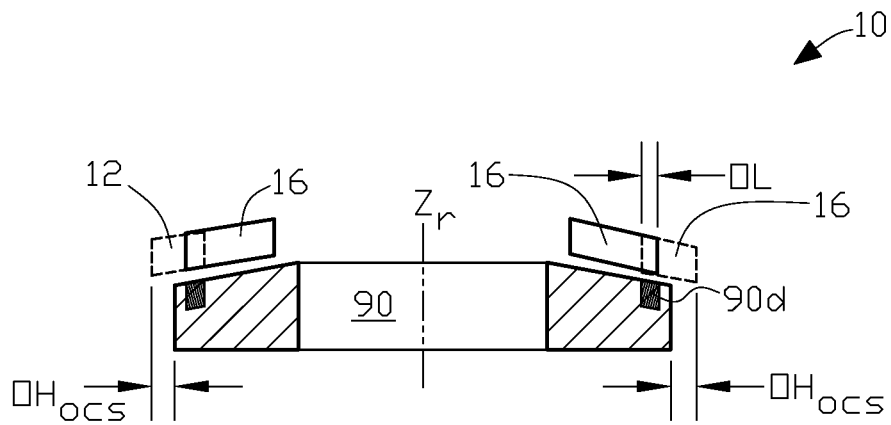
FIG. 4(b) illustrates in cross section an overlap induction heated region of the workpiece that in a complete rotation of the workpiece passes under a segment of both the outer and inner coil segments.

Changing the segments widths ratio (defined as the ratio of the average width, $w_{ics}$, of the inner coil segment to the average width, $w_{ocs}$, of the outer coil segment as illustrated, for example, in FIG. 4(a)) assists in the controlled distribution of induced heat between the outer and inner boundary regions of the workpiece. Preferably, but not by way of limitation, the width of the outer coil segment is less than the width of the inner coil segment as illustrated for the example of the induction coil 10 of the present invention in FIG. 2(a), FIG. 2(b) and FIG. 4(a). FIG. 4(a) also illustrates that outer coil segment 12 overhangs the edge of workpiece 90 by distance $OH_{ocs}$. Further as workpiece 90 is rotated below induction coil 10 with ac current applied to the coil, there is annular segment 90d of the gear teeth region that benefits from a radial overlap, OL, of the outer and inner coil segments as illustrated in cross section in FIG. 4(b) and dashed circles in FIG. 2(a) that generally represent the widest radial sweep region under the outer and inner coil segments.

Figure 4C:
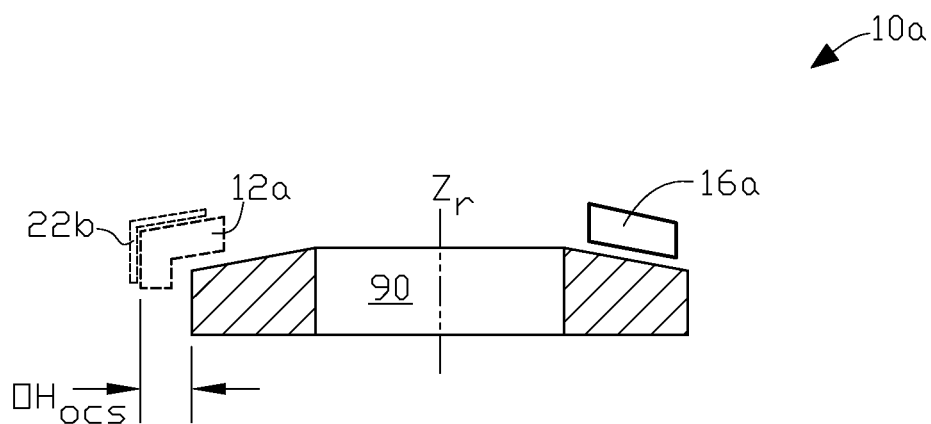
FIG. 4(c) is a cross sectional view of another example of an induction coil of the present invention wherein the overhang region of the outer coil segment extends down partially along the side of the workpiece.

FIG. 4(c) illustrates another example of an induction coil 10a used with the electric induction heat apparatus of the present invention wherein the outer coil segment 12a overhangs the edge of workpiece 90 by distance $OH_{ocs}$ and extends partially down along the edge of the workpiece. This optional arrangement assists in induced heating of the outer edge of the gear teeth region or outer edge of the region to be inductively heated.

Figure 5A:
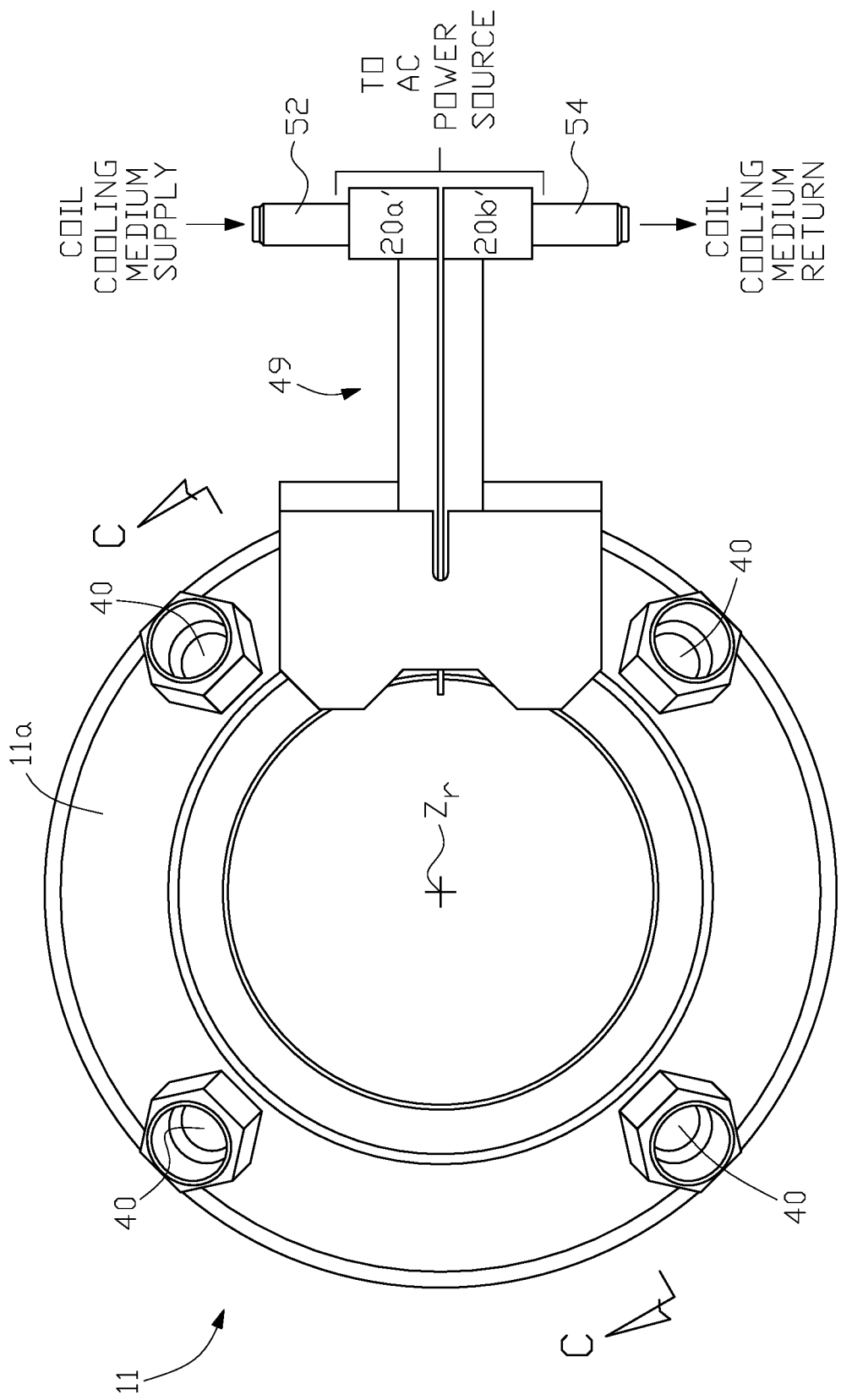
FIG. 5(a) is a top view of another example of the electric induction heat treatment apparatus of the present invention.
Figure 5B:
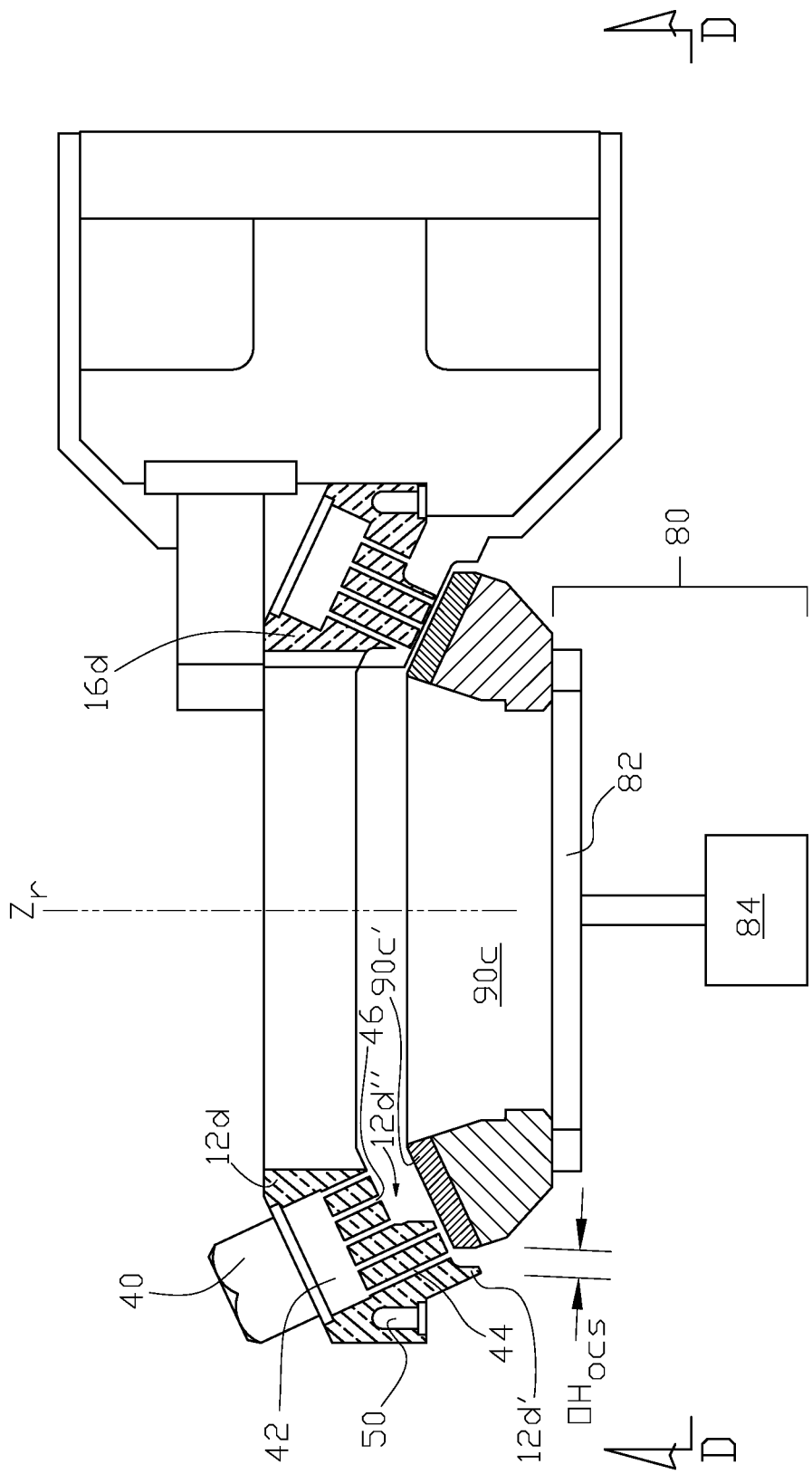
FIG. 5(b) is a cross sectional view through line C-C in FIG. 5(a) of the electric induction heat treatment apparatus shown in FIG. 5(a).

FIG. 5(a), FIG. 5(b) and FIG. 5(c) illustrate another example of the electric induction heat treatment apparatus 11 of the present invention wherein the induction coil is cooled by a fluid medium and an optional quench system is provided to rapidly cool the workpiece after induction heating. Enclosure 11a is provided to form an enclosed quenchant chamber in the base of induction coil 10c. The coil comprises outer coil segment 12c, transition coil segment 14c and inner coil segment 16c, as best seen in different angled cross hatch for each segment in FIG. 5(c). Workpiece 90c can be a hypoid gear (shown in cross section in FIG. 5(b)) with gear teeth region 90c' (diagrammatically shown in cross hatch) disposed below the segments of the coil. Rotator 80 provides a means for rotating workpiece 90c, and in this non-limiting example, comprises workpiece mounting structure 82 and rotational driver 84, such as an electric motor, with its output shaft connected to the mounting structure for rotation of the mounting structure and workpiece 90c. Quenchant inlets 40 provide inlet passages for the flow of a quenchant medium, such as water, into quenchant chamber 42 when a suitable source of quenchant is connected to inlets 40. Quenchant passages 44 formed through the coil segments permit the flow of quenchant from the quenchant chamber to passage outlets 46 to spray quenchant onto workpiece 90c during the gear hardening process. A suitable source of ac power is connected to power terminals 20a' and 20b' and fed to induction coil 10c via supply conduit 49. In this non-limiting example the induction coil segments are cooled by a fluid medium, such as water, supplied from a suitable source to inlet 52 and fed to enclosed annular cooling chamber 50 (FIG. 5(b)) embedded in the bottom, or other portions of the segments of the induction coil via supply conduit 49 with return cooling medium exiting the apparatus through outlet 54.

Referring to FIG. 5(b), in any examples of the present invention, either the outer and/or inner coil segments may be profiled in cross section as illustrated in region 12d" for outer coil 12d whereby, for example, the inner region of the outer coil segment has a larger gap between the adjacent faces of the outer coil segment and workpiece 90c than the same gap in the outer region of the outer coil segment. Further the gaps for the outer and inner coil segments may be different depending upon the desired induced heating requirements. Also illustrated in FIG. 5(b) is optional region 12d' of outer coil segment 12d, which extends partially down along the edge of the workpiece.

While a single turn induction coil is illustrated in the above examples of the invention, multiple single turn coils or a multi-turn coil with outer, transition and inner coil segments, or combinations thereof with uniform circular coil turns may be used in other examples of the invention. Further multiple inner, outer and transition segments may be used in a single turn coil. The actual shape of the inner, outer and transition coil sections will vary depending upon a particular application. The term "single turn induction coil" encompasses a coil that extends for less than approximately 360 degrees around its central axis as shown in the above examples of the invention as long as the coil comprises an outer, transition and inner coil segment as otherwise described herein.

The induction coil of the present invention may be sculpted from a single piece of electrically conductive material, such as copper, or assembled from separate components for the inner, outer and transition coil segments. For example induction coil 10c may be formed from a solid copper annular workpiece by machining regions of the workpiece to achieve the desired geometry of the segments making up the induction coil. In alternative examples of the invention, less than all of the segments of the induction coil may have internal cooling chambers or passages, and less than all of the segments of the induction coil may have quenchant outlets.

In some examples of the invention, a flux concentrator may be positioned at least partially around one of the coil segments so as to direct magnetic flux towards the workpiece. For example referring to FIG. 4(a), a U-shaped concentrator 22a may be positioned above and along the sides of outer coil segment 12 at least for a partial length of the outer coil segment, or referring to FIG. 4(c), an L-shaped concentrator 22b may be positioned above and along the overhung side of outer coil segment 12a at least for a partial length of the outer coil segment.

In the induction heating process of the present invention, heat treatment of regions of the workpiece to final temperature can be done in two or more heating stages during which the workpiece is rotated beneath the inductor. Typically the initial heating stage is followed by one or more intermediate heating stages to preheat the workpiece. Relatively low power is applied during the initial and intermediate pre-heating stages. Those stages are typically followed by one or more short duration, high power, final heating stage(s). The pre-heating stages alternate with soak stages during which no induction power is applied to the workpiece to allow heat induced during prior heating stages to penetrate (soak) into the gear teeth region. With the induction heat treatment apparatus of the present invention, duration of the soak stages increase while energy consumption during pre-heat stages decrease over that previously achievable.

Figure 6A:
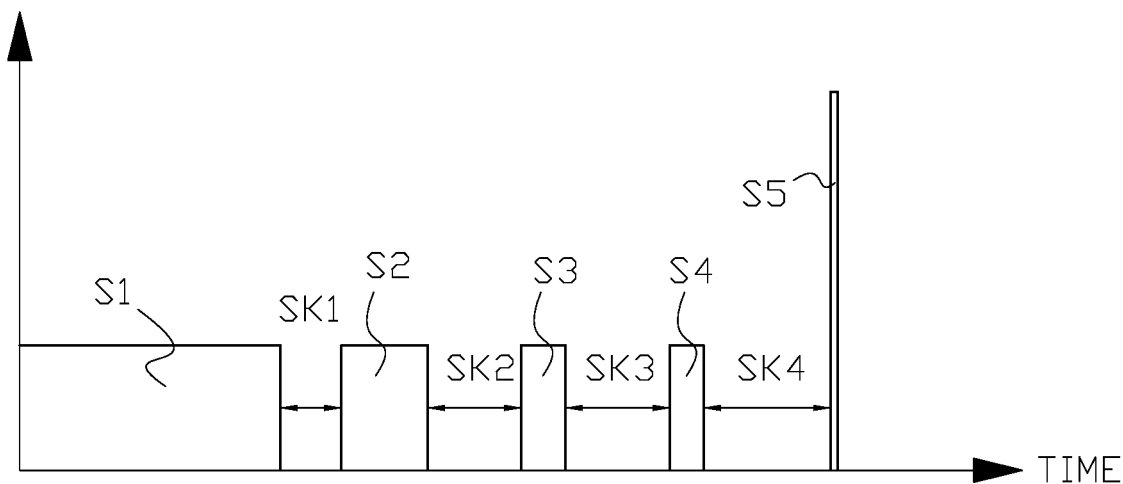
FIG. 6(a) and FIG. 6(b) illustrate one example of applied induction power and consumed energy schedules, respectively, for one example of the electric induction heat treatment process of the present invention.
Figure 6B:
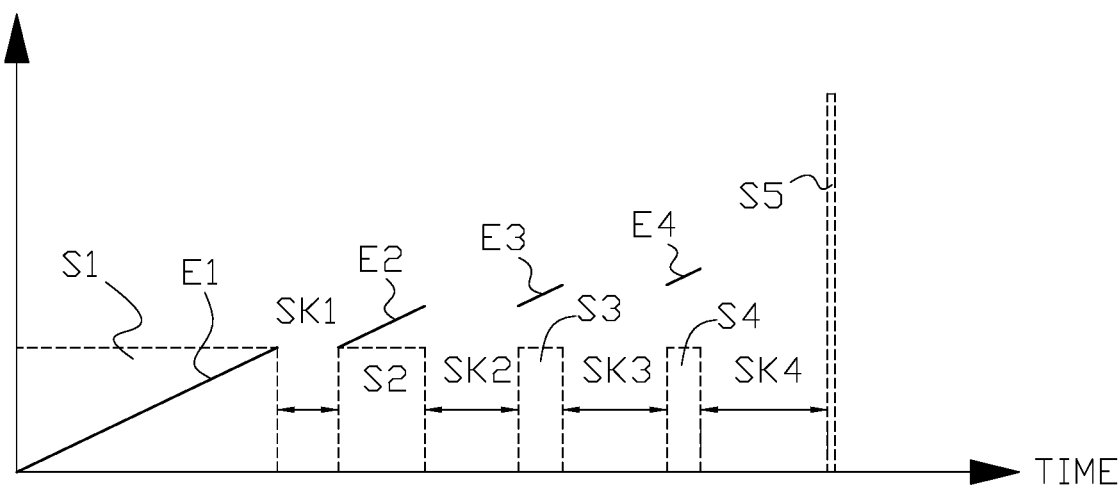
Figure 7A:
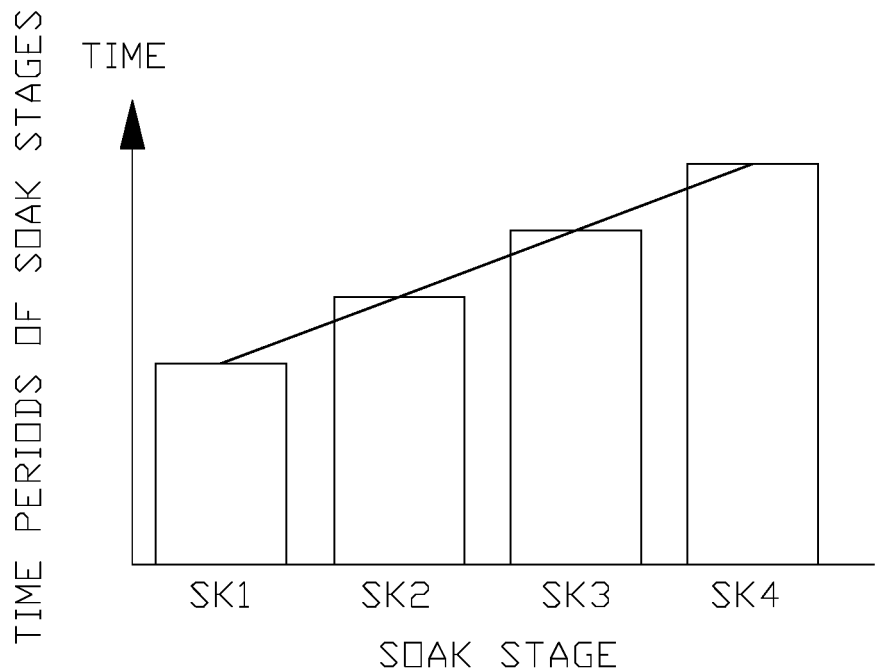
FIG. 7(a) and FIG. 7(b) illustrate one example of the change in duration of progressive soaking stages and the change in induction pre-heat energy levels, respectively, for progressive pre-heat stages.
Figure 7B:
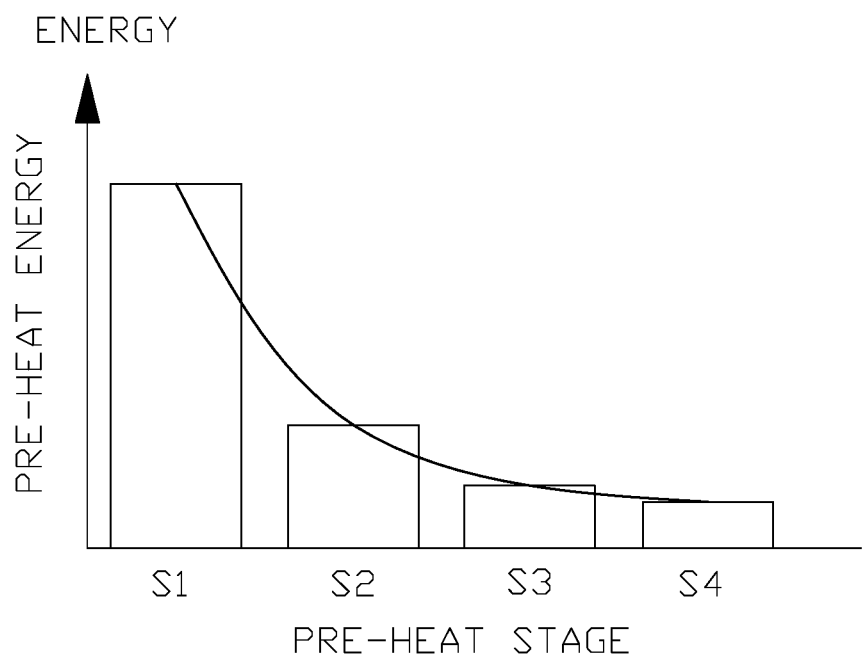

One example of such process is illustrated in FIG. 6(a) and FIG. 6(b). Referring to FIG. 6(a) initial per-heat stage S1 power level of 60 kW is applied for 24 seconds with workpiece revolution speed of 250 revolutions per minute; after 6 seconds of soak stage SK1 during which the workpiece can continue to rotate at 250 revolutions per minute; second pre-heat stage S2 power level of 60 kW is applied for 8 seconds with workpiece revolution speed of 250 revolutions per minute, after 9 seconds of soak stage SK2 during which the workpiece can continue to rotate at 250 revolutions per minute; third pre-heat stage S3 power level of 60 kW is applied for 4 seconds with workpiece revolution speed of 250 revolutions per minute, after 10 seconds of soak stage SK3 during which the workpiece can continue to rotate at 250 revolutions per minute; fourth pre-heat stage S4 power level of 60 kW is applied for 3 seconds with workpiece revolution speed of 250 revolutions per minute, after 12 seconds of soak stage SK4 during which the workpiece can continue to rotate at 250 revolutions per minute. After soak stage SK4, high heat stage S5 power level of 350 kW is applied for 0.5 seconds with workpiece revolution speed of 500 revolutions per minute. In this example ac frequency for the pre-heating stages is 150 kHz and 150 kHz for the final heating stage; a typical workpiece for this non-limiting example would have an outside diameter of 7.75 inches and an inside diameter of 5.25 inches. FIG. 7(a) graphically illustrates the increase in time duration of soak stages in going from soak stage SK1 to soak stage SK4. FIG. 6(b) graphically illustrates energy expended in the pre-heat stages (E1 through E4) while FIG. 7(b) graphically illustrates the trend in decrease of expended energy in going from initial pre-heat stage S1 to final pre-heat stage S4.

Preferably rotational speed of the workpiece during the final heat stage provides at least two revolutions of each gear tooth.

While in the above non-limiting example of the invention the workpiece was rotated during the soak stages, in other examples of the invention the workpiece may be stationary for at least part of the one or more of the soak stages.

While in the above non-limiting example of the invention during pre-heat and final heat stages the rotation speed of the workpiece is different, in other examples of the invention rotation speed can be the same during pre-heat stages and final heat stage.

While in the above non-limiting example of the invention a single frequency was used during the pre-heating stages and final heating stage, in other examples of the invention, different frequencies may be used during pre-heat stages and final heat stage. For example a single lower frequency, or multiple lower frequencies, can be used in the pre-heat stages to provide enhanced pre-heat of tooth root areas.

While in the above non-limiting example of the invention the same induction coil can be used for pre-heat and final heat, in other examples of the invention different induction coils, that is, induction coils that have at least a distinguishing inner, outer or transition segment, and/or different supplied power characteristics, can be used for one or more of the pre-heat and/or final heat stages. For example using different coils for these stages can facilitate pre-heating selected areas of a workpiece's gear face to different temperature levels; for some gear geometries a heated temperature gradient across the gear face is desirable prior to the final heat stage. When different induction coils are used, a multi-station apparatus of the present invention may be provided wherein each station includes a different induction coil, and intervening soak stages may occur either in whole, or in part, during the time that the workpiece is transported between the stations.

While the non-limiting example of the invention graphically illustrated in FIG. 6(a) and FIG. 6(b) uses sequential applied power stages and non-applied power (soak) stages, in other examples of the invention similar, or otherwise desirable, pre-heating can be accomplished by continuously applied power that is appropriately controlled (for example, power magnitude and/or frequency variations) over time.

While in the above examples of the invention the workpiece is rotated while the induction coil is kept stationary, in other examples of the invention the induction coil may be rotated while the workpiece is kept stationary, or a combined rotation of both the induction coil and workpiece may be used.

While the central axis of the induction coil and workpiece are substantially coincident in the above examples of the invention, in other examples of the invention, the central axis of the induction coil may be offset from the central axis of the workpiece.

The above examples of the invention have been provided merely for the purpose of explanation, and are in no way to be construed as limiting of the present invention. While the invention has been described with reference to various embodiments, the words used herein are words of description and illustration, rather than words of limitations. Although the invention has been described herein with reference to particular means, materials and embodiments, the invention is not intended to be limited to the particulars disclosed herein; rather, the invention extends to all functionally equivalent structures, methods and uses. Those skilled in the art, having the benefit of the teachings of this specification, may effect numerous modifications thereto, and changes may be made without departing from the scope of the invention in its aspects.

The invention claimed is:

1. An electric induction heating apparatus for heating a gear-like article having an annular region around a central axis of one or more discrete protrusions from a surface of the gear-like article, the apparatus comprising:

a single turn induction coil disposed above or below the gear-like article for the annular region of one or more discrete protrusions to face the single turn induction coil, the single turn induction coil comprising:

an outer coil segment having an outer coil segment face opposing, at least in part, a radially outer region of the annular region of the one or more discrete protrusions, the outer coil segment having an outer coil segment outer end and an outer coil segment inner end, the outer coil segment arranged to inductively heat the radially outer region of the one or more discrete protrusions;

an inner coil segment having an inner coil segment face opposing, at least in part, a radially inner region of the annular region of the one or more discrete protrusions, the inner coil segment having an inner coil segment outer end and an inner coil segment inner end, the outer coil segment radially disposed further away from the central axis than the inner coil segment, the inner coil segment arranged to inductively heat the radially inner region of the one or more discrete protrusions; and a transition coil segment connected between the inner end of the outer coil segment and the inner end of the inner coil segment, the transition coil segment having a transition coil segment face opposing a transverse region of the annular region of the one or more discrete protrusions to inductively heat the transverse region of at least a partial length of a face width of the one or more discrete protrusions wherein the transverse region is located between the radially outer region and the radially inner region of the one or more discrete protrusions; and an alternating current source connected between the outer end of the outer coil segment and the outer end of the inner coil segment of the single turn induction coil.

2. The electric induction heating apparatus of claim 1 wherein the transition coil segment is disposed relative to the gear-like article so as to transverse at least partially across a length of the one or more discrete protrusions in the transverse region.

3. The electric induction heating apparatus of claim 1 further comprising a means for rotating the gear-like article.

4. The electric induction heating apparatus of claim 1 wherein the outer coil segment or the inner coil segment is arcuately shaped.

5. The electric induction heating apparatus of claim 1 wherein the lengths and widths of the outer coil segment and the inner coil segment are varied to achieve an induced heating pattern across the radially outer and inner regions of the one or more discrete protrusions.

6. The electric induction heating apparatus of claim 1 wherein the width of the outer coil segment is less than the width of the inner coil segment.

7. The electric induction heating apparatus of claim 1 wherein an inside boundary of the inner coil segment is greater than an inside boundary of the one or more discrete protrusions from the central axis of the gear-like article.

8. The electric induction heating apparatus of claim 1 wherein an outside boundary of the outer coil segment is greater than an outside boundary of the one or more discrete protrusions from the central axis of the gear-like article.

9. The electric induction heating apparatus of claim 8 wherein the outer coil segment overhangs an edge of the gear-like article.

10. The electric induction heating apparatus of claim 1 wherein at least one of the outer or inner coil segments of the single turn induction coil is profiled in cross section.

11. The electric induction heating apparatus of claim 1 further comprising an at least one flux concentrator extending at least partially around at least one of the outer, inner or transition coil segments.

12. The electric induction heating apparatus of claim 1 wherein a first gap distance formed respectively between one of either the outer or inner coil segment face and the opposing radially outer or inner region of the annular region of the one or more discrete protrusions is different from a second gap distance formed respectively between the other one of either the outer or inner coil segment face and the opposing radially outer or inner region of the annular region of the one or more discrete protrusions.

13. The electric induction heating apparatus of claim 1 further comprising at least one cooling medium passage through at least one of the outer, inner or transition coil segments of the single turn induction coil.

14. The electric induction heating apparatus of claim 1 further comprising a base to which the outer coil segment, inner coil segment and transition coil segment are attached.

15. The electric induction heating apparatus of claim 14 wherein the base comprises a quenchant chamber having at least one quenchant inlet for supply of a quenchant to the quenchant chamber and at least one of the outer, inner or transition coil segments of the single turn induction coil has a plurality of quenchant outlets for delivery of the quenchant to the inductively heated radially outer, radially inner, and transverse regions of the one or more discrete protrusions.

16. The electric induction heating apparatus of claim 1 wherein the gear-like article is an intersecting axes gear or a non-intersecting and non-parallel axes gear and the one or more discrete protrusions are gear teeth.

17. A method of induction heating one or more discrete protrusions from an annular surface region around a central axis of a gear-like article, the method comprising:

orienting the gear-like article above or below a single turn induction coil for the one or more discrete protrusions from the annular surface region to face the single turn induction coil;

rotating the gear-like article with the one or more discrete protrusions facing the single turn induction coil comprising an outer coil segment having an outer coil segment face opposing, at least in part, a radially outer region of the annular surface region of the one or more discrete protrusions, the outer coil segment having an outer coil segment outer and inner ends, the outer coil segment arranged to inductively heat the radially outer region of the one or more discrete protrusions; an inner coil segment having an inner coil segment face opposing, at least in part, a radially inner region of the annular region of the one or more discrete protrusions, the inner coil segment having an inner coil segment outer and inner ends, the outer coil segment radially disposed further away from the central axis than the inner coil segment, the inner coil segment arranged to inductively heat the radially inner region of the one or more discrete protrusions; and a transition coil segment connected between the outer and inner coil segment inner ends, the transition coil segment having a transition coil segment face opposing a transverse region of the annular region of the one or more discrete protrusions wherein the transverse region is located between the radially outer region and the radially inner region of the one or more discrete protrusions to inductively heat the transverse region of at least a partial length of a face width of the one or more discrete protrusions; and connecting a source of alternating current to the outer ends of the outer and inner coil segments of the single turn induction coil to generate a magnetic flux field that couples with the one or more discrete protrusions to inductively heat the one or more discrete protrusions.

18. The method of claim 17 further comprising the step of supplying an internal cooling medium to at least one of the outer, inner or transition coil segments of the single turn induction coil.

19. The method of claim 17 further comprising the step of supplying a quenchant to the one or more discrete protrusions through a plurality of quenchant openings in at least one of the outer, inner or transition coil segments of the single turn induction coil.

20. The method of claim 17 further comprising the steps of inductively heating the one or more discrete protrusions by a series of sequentially decreasing pre-heat time periods at a pre-heat power level, each of the series of sequentially decreasing time periods followed by a sequentially increasing soak time period; and inductively heating the one or more discrete protrusions by an at least one final heat time period at a final heat power level following the series of sequentially decreasing pre-heat time periods at the pre-heat power level, the at least one final heat time period being shorter than any of the pre-heat time periods and the final heat power level being greater than the pre-heat power level.

21. The method of claim 20 wherein the series of sequentially decreasing pre-heat time periods comprises a series of four sequentially decreasing pre-heat time periods, a final pre-heat time period being one-half of an initial pre-heat time period, the sequentially increasing soak time period comprises a series of four sequentially increasing soak time periods, a final soak time period being twice an initial pre-heat time period, the at least one final heat time period being 0.025 times the initial pre-heat time period, the final heat power level being 5.4 times the pre-heat power level.

22. An electric induction heating apparatus for heating a gear-like article having an annular region around a central axis of one or more discrete protrusions from a surface of the gear-like article, the apparatus comprising:
   a single turn induction coil disposed above or below the gear-like article for the annular region of one or more discrete protrusions to face the single turn induction coil, the single turn induction coil comprising:
      an outer coil segment having an outer coil segment face opposing, at least in part, a radially outer region of the annular region of the one or more discrete protrusions, the outer coil segment having an outer coil segment outer end and outer coil segment inner end, the outer coil segment arranged to inductively heat the radially outer region of the one or more discrete protrusions;
      an inner coil segment having an inner coil segment face opposing, at least in part, a radially inner region of the annular region of the one or more discrete protrusions, the inner coil segment having an inner coil segment outer end and inner coil segment inner end, the outer coil segment radially disposed further away from the central axis than the inner coil segment, the inner coil segment arranged to inductively heat the radially inner region of the one or more discrete protrusions; and
      a transition coil segment connected between the inner end of the outer coil segment and the inner end of the inner coil segment, the transition coil segment having a transition coil segment face opposing a transverse region of the annular region of the one or more discrete protrusions to inductively heat the transverse region of at least a partial length of a face width of the one or more discrete protrusions wherein the transverse region is located between the radially outer region and the radially inner region of the one or more discrete protrusions, the transition coil segment disposed relative to the gear-like article so as to transverse at least partially across the length of the one or more discrete protrusions in the transverse region;
   an alternating current source connected between the outer end of the outer coil segment and the outer end of the inner coil segment of the single turn induction coil; and
   a means for rotating the gear-like article.

* * * * *